United States Patent
Park (10) Patent No.: US 8,305,592 B2
(45) Date of Patent: Nov. 6, 2012

(54) IMAGE FORMING SYSTEM AND APPARATUS THAT DISPLAYS A SETTING ITEM, AND CONTROL METHOD THEREOF

(75) Inventor: Chang-soo Park, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 867 days.

(21) Appl. No.: 11/953,260

(22) Filed: Dec. 10, 2007

(65) Prior Publication Data

US 2008/0151277 A1    Jun. 26, 2008

(30) Foreign Application Priority Data

Dec. 20, 2006  (KR) .................. 10-2006-0130897

(51) Int. Cl.
*G06F 3/12* (2006.01)
*G06K 15/00* (2006.01)
*G03G 15/00* (2006.01)

(52) U.S. Cl. .................. 358/1.13; 358/1.15; 358/1.16; 399/81

(58) Field of Classification Search .................. None
See application file for complete search history.

(56) References Cited

U.S. PATENT DOCUMENTS

| | | | |
|---|---|---|---|
| 5,614,993 A * | 3/1997 | Smith et al. | 399/81 |
| 5,774,570 A * | 6/1998 | Toju et al. | 382/112 |
| 7,408,674 B2 * | 8/2008 | Moro et al. | 358/1.9 |
| 2004/0051891 A1 * | 3/2004 | Moro et al. | 358/1.9 |
| 2004/0078806 A1 * | 4/2004 | Johnson et al. | 725/9 |
| 2004/0184103 A1 * | 9/2004 | Kremer et al. | 358/1.18 |
| 2004/0190057 A1 * | 9/2004 | Takahashi et al. | 358/1.15 |
| 2005/0162669 A1 * | 7/2005 | Park et al. | 358/1.1 |
| 2005/0198072 A1 * | 9/2005 | Iinuma et al. | 707/104.1 |
| 2005/0216862 A1 * | 9/2005 | Shinohara et al. | 715/825 |
| 2006/0017941 A1 * | 1/2006 | Momozono et al. | 358/1.1 |
| 2007/0109580 A1 * | 5/2007 | Yoshida | 358/1.13 |
| 2007/0212100 A1 * | 9/2007 | Kimoto et al. | 399/81 |

FOREIGN PATENT DOCUMENTS

| | | |
|---|---|---|
| KR | 2005-53381 | 6/2005 |
| KR | 2005-77868 | 8/2005 |

* cited by examiner

*Primary Examiner* — Vincent Rudolph
(74) *Attorney, Agent, or Firm* — Stanzione & Kim, LLP (57) ABSTRACT

A control method of an image forming control apparatus includes displaying a plurality of setting items about image forming, changing at least one setting value of the plurality of setting items and storing the plurality of setting items, and emphatically displaying a setting item, of which the setting value is changed, among the plurality of setting items.

27 Claims, 7 Drawing Sheets

IMAGE FORMING SYSTEM AND APPARATUS THAT DISPLAYS A SETTING ITEM, AND CONTROL METHOD THEREOF

CROSS-REFERENCE TO RELATED APPLICATIONS

This application claims priority under 35 U.S.C §119(a) from Korean Patent Application No. 10-2006-0130897, filed on Dec. 20, 2006 in the Korean Intellectual Property Office, the disclosure of which is incorporated herein by reference.

BACKGROUND OF THE INVENTION

1. Field of the Invention

The present general inventive concept relates to an image forming control apparatus which emphatically displays a changed setting item if a setting value of a plurality of setting items about image forming is collectively changed so that a user is capable of easily checking a changed setting item, and a control method thereof.

2. Description of the Related Art

An image forming control apparatus, controls an image forming apparatus such as a printer, a facsimile, a scanner, a multi-function peripheral (MFP) selectively having functions of the printer, the facsimile, the scanner and so on, through an interface part. Especially, a print driver of the image forming control apparatus converts a document written out through an application program into print data having a form readable by the image forming apparatus, and provides a User Interface (UI) screen through which a user sets a setting value of a plurality of setting items about an image forming process such as the number of copies, a paper type, a paper orientation, print quality and so on.

In other words, if the print driver prints a predetermined document, the print driver of the image forming control apparatus provides the UI screen about the setting items, and the user selects or changes the setting value of the various setting items about the image forming process through the UI screen. Also, the image forming apparatus prints the document based on the settling value set or selected by the user.

Recently, because many setting items about the image forming are provided, the UI screen of the print driver becomes more complicated. Therefore, if the user changes the setting values of the setting items, the function which stores the changed setting values to have a collective setting group name is added in the UI screen of the print driver. In other words, the user may change the setting values of the setting items in the UI screen of the print driver. Then, if it is possible to use the changed setting values, the user stores the changed setting values under the collective setting group name. Next, if the user inputs or selects the collective setting group name through the UI screen of the print driver later, the stored setting values are read so that the setting values displayed on the UI screen are changed accordingly.

However, after the user makes a plurality of collective setting group names, if the user selects and uses the needed collective setting group name, it is difficult to exactly check not only the collective setting group name that the user selects but also the setting value of the corresponding setting item that the user changes and stores in the selected collective setting group. Although the user selects one collective setting group name and changes the corresponding setting value, it is also difficult to check which setting item value is changed by the user.

SUMMARY OF THE INVENTION

The present general inventive concept provides an image forming control apparatus in which a user is easily capable of checking changed setting items if setting values of a plurality of setting items about an image forming process are collectively changed, and a control method thereof.

Additional aspects and utilities of the present general inventive concept will be set forth in part in the description which follows and, in part, will be obvious from the description, or may be learned by practice of the general inventive concept.

The foregoing and/or other aspects of the present general inventive concept can be achieved by providing a control method of an image forming control apparatus, the control method including displaying a plurality of setting items about an image forming process, changing at least one setting value of the plurality of setting items and storing the plurality of setting items, and emphatically displaying a setting item, of which the setting value is changed, among the plurality of setting items.

The emphatic displaying of the setting item may include highlighting the setting item changed in the setting value.

The emphatic displaying of the setting item may include differently displaying a font type or size of a setting item changed in the setting value.

The emphatic displaying of the setting item may include displaying a color of the setting item changed in the setting value differently from a default color.

The storing of the plurality of setting items may include storing the plurality of setting items, of which the setting value is changed, as a collective setting group name.

The control method may further include generating and displaying at least one menu for allowing a user to input the collective setting group name.

The control method may further include displaying a list of the stored one or more collective setting group names.

The control method may further include, when one of the displayed collective setting group names is selected, emphatically displaying the setting item changed in the setting value among the setting items stored in the selected collective setting group name.

The control method may further include converting a print object document into print data on the basis of the setting value of the plurality of setting items, and outputting the print data to a predetermined image forming apparatus.

Another aspect of the present invention is to provide an image forming control apparatus including: a display; a driver which drives a predetermined image forming apparatus on the basis of a setting value of a plurality of setting items about image forming; and a controller which controls the display to emphatically display at least one setting item, whose setting value is changed, among the plurality of setting items stored in the driver.

The controller may process the setting item changed in the setting value to be highlighted.

The controller may process a font type or size of a setting item changed in the setting value to be displayed differently.

The controller may process a color of the setting item changed in the setting value to be displayed differently from a default color.

The controller may process the plurality of setting items, of which the setting value is changed, to be stored as a collective setting group name.

The controller may control the display to generate and display at least one menu for allowing a user to input the collective setting group name.

The controller may control the display to display a list of the one or more collective setting group names managed in the driver.

When one of the displayed collective setting group names is selected, the controller may control the display to emphatically display the setting item changed in the setting value among the setting items stored in the selected collective setting group name.

The controller may convert a print object document into print data on the basis of the setting value of the plurality of setting items and output the print data to a predetermined image forming apparatus.

The image forming control apparatus may further include a user input part, wherein the controller changes the setting value on the basis of a setting command input through the user input part.

The image forming control apparatus may further include an interface part, wherein the controller converts a print object document into print data on the basis of the setting value stored in the driver and outputs the print data to a predetermined image forming apparatus through the interface part.

The foregoing and/or other aspects and utilities of the present general inventive concept may also be achieved by providing a control method of an image forming control apparatus, the control method including generating a screen image to display a plurality of setting items and to emphatically display one of the setting items having a change setting value.

The control method may further include selecting one of collective setting group names to correspond to the plurality of setting items, and the screen image may be generated according to the selected collective setting group name.

The plurality of setting items may include a first setting item having a non-changed setting value, and a second setting item having the changed setting value, and the first setting item is not emphatically displayed.

The foregoing and/or other aspects and utilities of the present general inventive concept may also be achieved by providing an image forming control apparatus including a controller to generate a screen image to display a plurality of setting items and to emphatically display one of the setting items having a change setting value.

The foregoing and/or other aspects and utilities of the present general inventive concept may also be achieved by providing a computer-readable medium containing computer-readable codes as a program to execute a method of an image forming control apparatus, the method including generating a screen image to display a plurality of setting items and to emphatically display one of the setting items having a change setting value.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Figure 1:
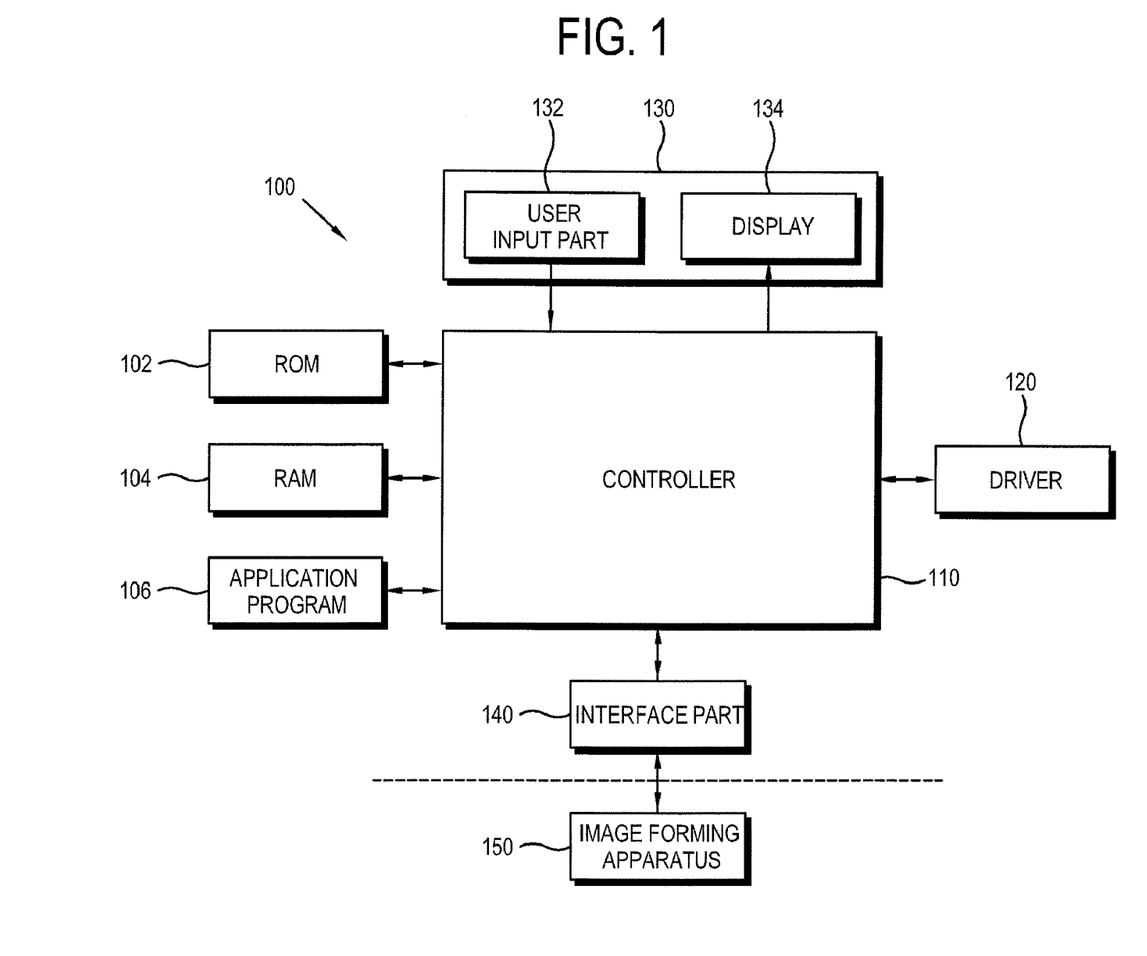
FIG. 1 is a block diagram schematically illustrating an image forming control apparatus according to an exemplary embodiment of the present general inventive concept.

As illustrated in FIG. 1, an image forming control apparatus 100 is connected to a predetermined image forming apparatus 150 through an interface part 140. The interface part 140 makes the image forming control apparatus 100 to be able to mutually communicate with the image forming apparatus 150, and provides a local connection by a Universal Serial Bus (USB) port or a Line Print Terminal (LPT) port, a network connection by an IP sharer or a wireless network connection.

The image forming control apparatus includes a Read Only Memory (ROM) 102, a Random Access Memory (RAM) 104, an application program part 106, a controller 110, a driver 120 and a user interface UI part 130.

The ROM 102 stores various kinds of control programs to perform a function of the image forming control apparatus 100, the RAM 104 stores a program to be executed by the controller 110 including a central processing unit (CPU) (not shown) after being loaded from the ROM 102 or stores data processed by the controller 110, and the application program part 106 has an application program through which a user writes or forms various kinds of documents.

The driver 120 stores setting values for a plurality of setting items about an image forming process such as the number of copies, a paper type, a paper orientation, print quality and so on. For example, if the document written through the application program of the image forming control apparatus 100 is printed through a printer which is one of the image forming apparatuses 150, the setting values of the setting items may be provided by a printer manufacturer and be set as initial setting values in the image forming control apparatus 100 so as to control a print function of the printer according to the initial setting values. Here, the setting values for the plurality of setting items may be stored in the driver 120 under at least one collective setting group name. Furthermore, the driver 120 transforms a print object document provided from the application program part 106 into print data which the image forming apparatus 150 is capable of reading based on the preset setting values.

Figure 2:
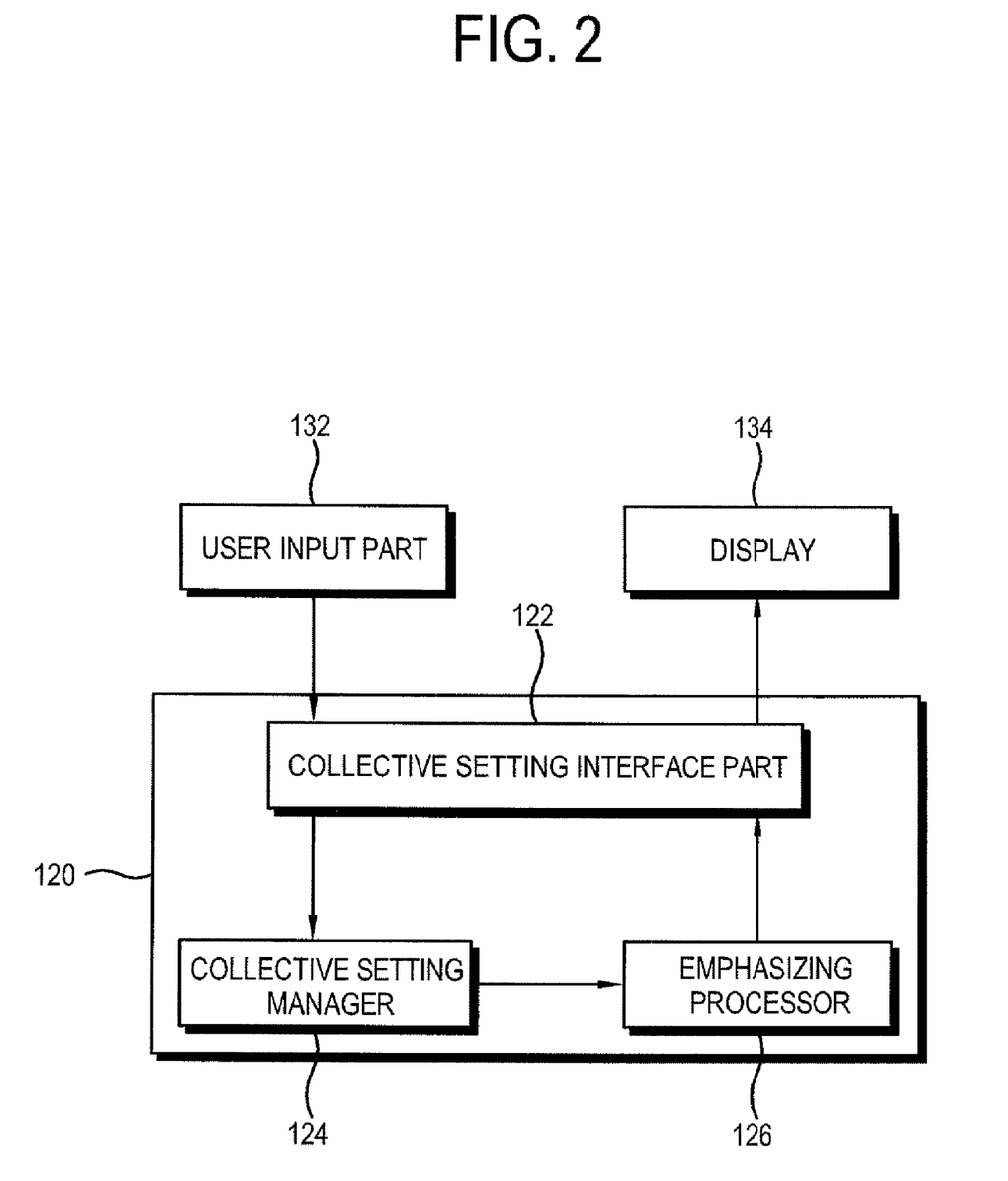
FIG. 2 is a block diagram illustrating a driver of the image forming control apparatus of FIG. 1.

As illustrated in FIG. 2, the driver 120 comprises a collective setting interface part 122, a collective setting manager 124 and an emphasizing processor 126 so as to manage a collective setting process.

The collective setting interface part 122 performs an interface function to store a collective setting group name, the setting item and the setting value inputted by the user in the collective setting manager 124 if the user changes the setting value of the setting item displayed on the display 134 and inputs the collective setting group name through the user input part 132.

The collective setting manager 124 stores and manages the collective setting group name, the setting item received through the collective setting interface part 122, and the setting value inputted by the user. Furthermore, if the user inputs the collective setting group name stored in the collective setting manager 124 in a collective setting group name input area 532 (FIG. 5A) of the display 134, the setting item, and the setting value stored in the inputted collective setting group name are outputted to the emphasizing processor 126.

The emphasizing processor 126 processes the setting item and the setting value so that the setting item and the setting value outputted from the collective setting manager 124 are emphatically displayed on the display 134. Then, the processed setting item and setting value include information of coordinates, a location, a font size and so on of the setting item and the setting value which are supposed to be emphatically displayed. The processed setting item and setting value are displayed on the display 134 through the collective setting interface part 122.

The UI part 130 provides an interface to the user to select or change the setting values of the driver 120, and comprises the user input part 132 and the display 134.

The user input part 132 is an input part such as a keyboard, a mouse and other conventional devices, and transmits a setting command by the user to the controller 110 to select or change the setting value displayed on the display 134. The display 134 is a display apparatus such as a Cathode Ray Tube (CRT), Liquid Crystal Display (LCD) and so on, and displays the setting value and so on about the plurality of setting items stored in the driver 120.

The controller 110 includes a Central Processing Unit (CPU), a microcomputer and so on, and controls a general operation of the image forming control apparatus 100 by using various kinds of stored control programs.

FIGS. 1 and 2 illustrate the image forming control apparatus to collective setting of the driver 120 as an exemplary embodiment of the present general inventive concept. The driver 120 of the FIGS. 1 and 2 comprises any configuration performing a function of storing and managing the configuration with respect to the collective setting process as well as a physical driver.

Figure 5A:
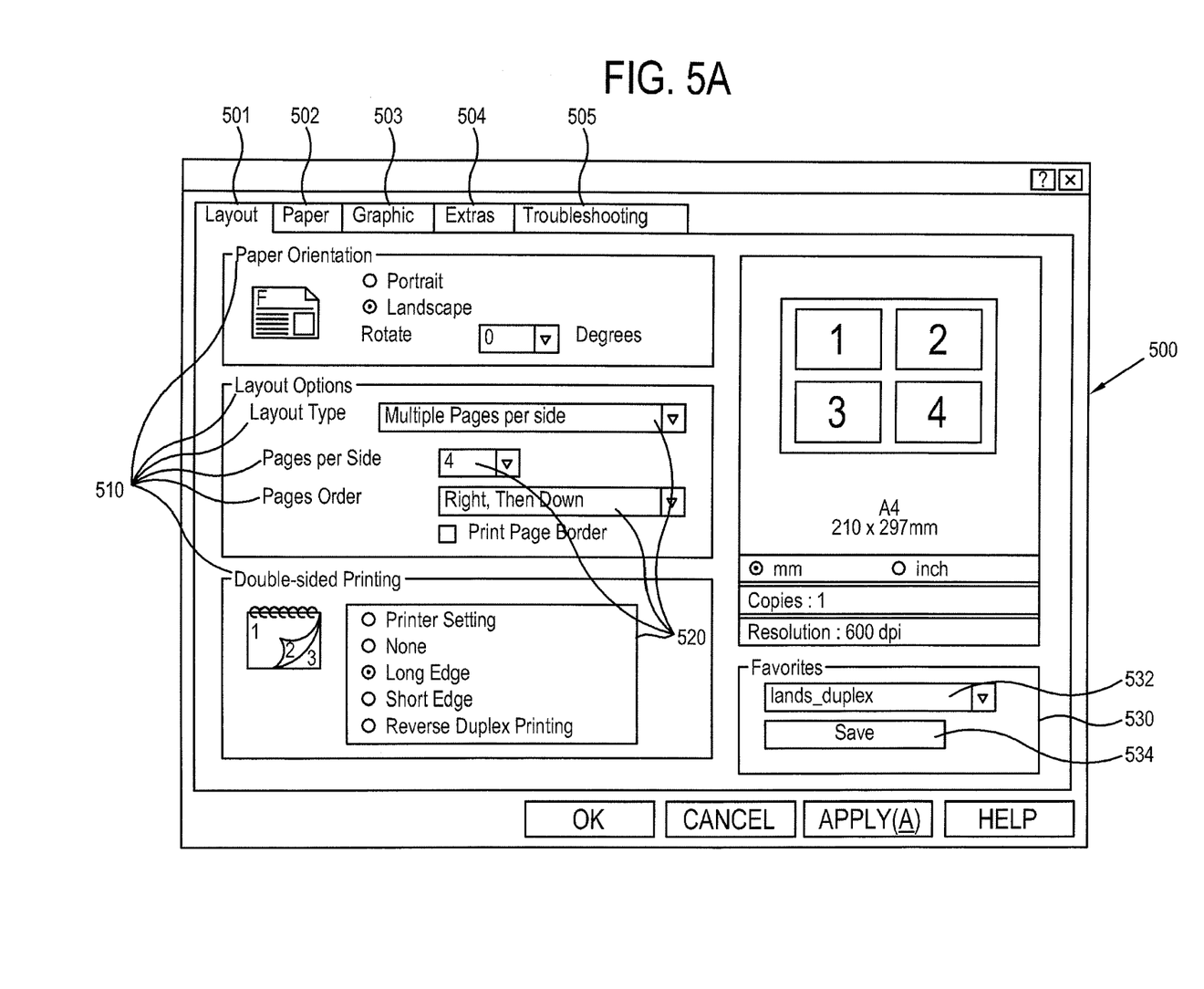
FIG. 5A to 5C illustrate examples of an option setting screen generates from an image forming control apparatus and a control method thereof according to the present general inventive concept.
Figure 5B:
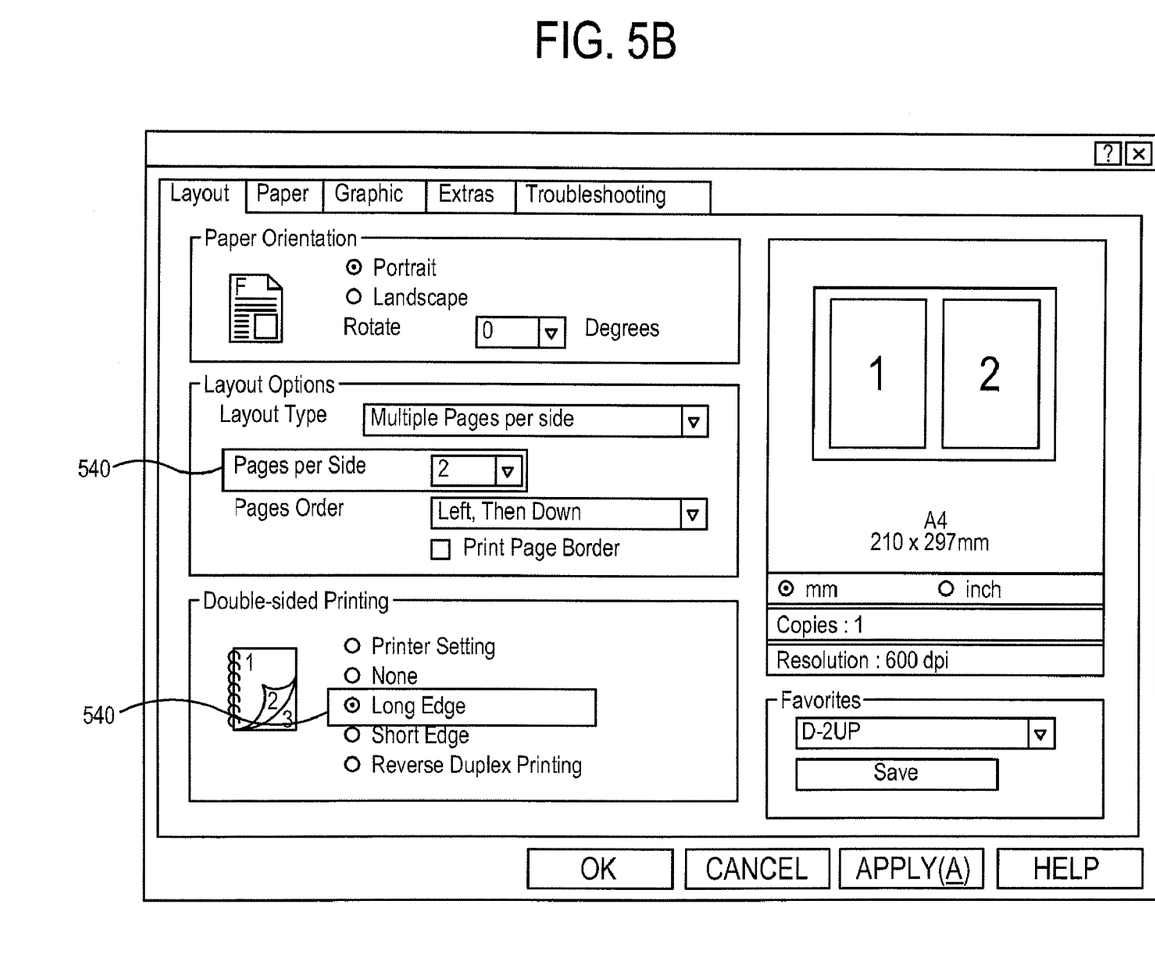
Figure 5C:
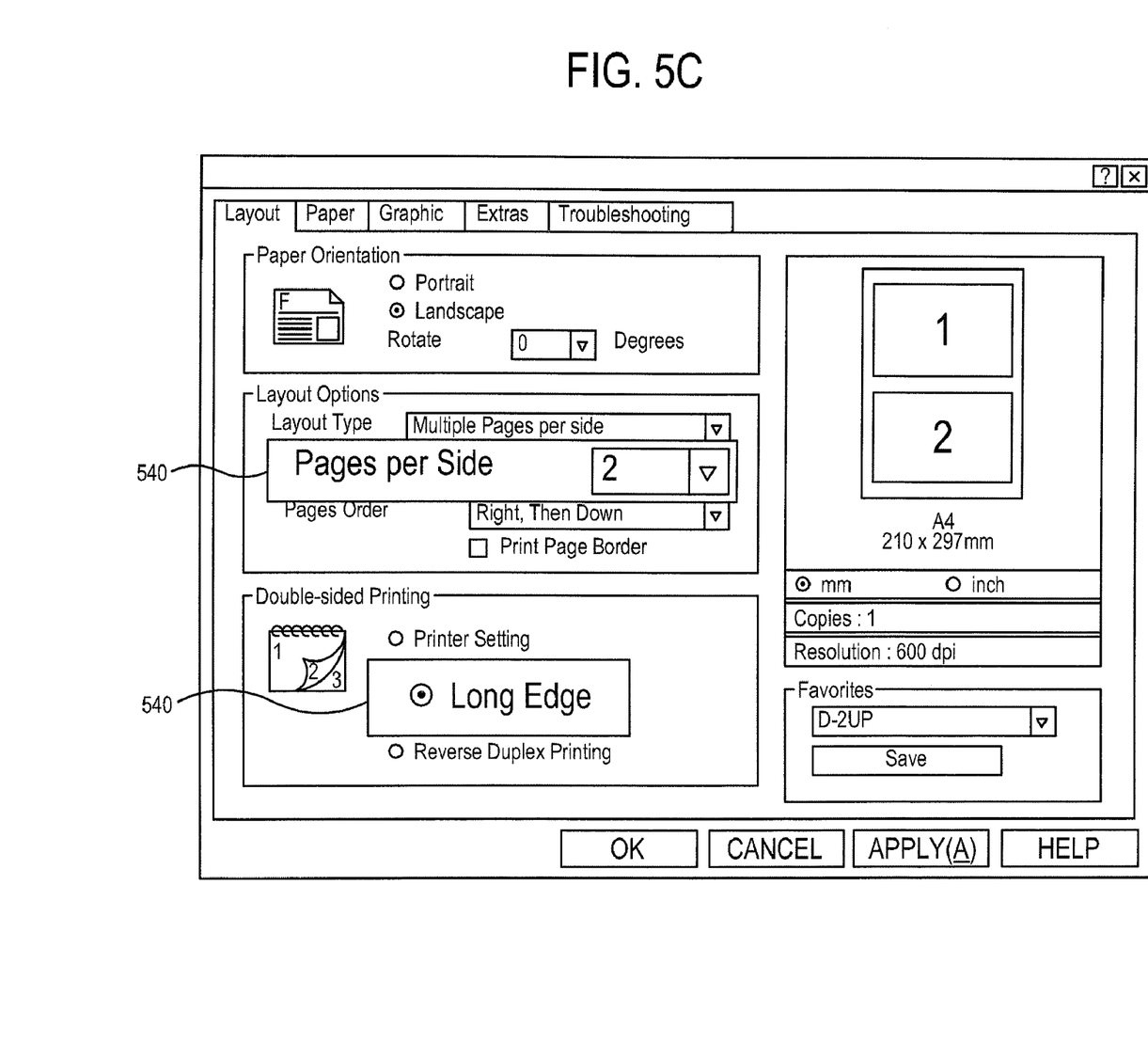

Hereinafter, an operation of the image forming control apparatus according to an exemplary embodiment of the present general inventive concept is described in detail by referring to FIGS. 5A to 5C illustrating an example of an option setting screen exemplarily embodied by the image forming control apparatus according to the present embodiment.

The controller 110 of the image forming control apparatus 100 displays the option setting screen 500 showing a setting item and a default setting value (or an initial setting value) of the setting item stored in the driver 120 on the display 134. The option setting screen 500 includes a layout tap 501, a paper tap 502, a graphic tap 503, an extras tap 504 and a troubleshooting tap 505 and so on, as a plurality of tap screens.

Furthermore, the respective tap screens display the plurality of setting items and a setting value changing area 520 which displays and changes the setting value of the setting item. FIG. 5A shows that the setting items 510 of the layout tap 501 includes a paper orientation, layout options, a layout type, pages per side, a pages order, and double-sided printing, and the setting values thereof.

The user changes the setting values in the option setting screen 500 of FIG. 5A, inputs the collective setting group name in the collective setting group name input area 532 of a collective setting group name managing area 530 and clicks a storing button. Here, the controller 110 may control the display 134 to generate and display at least one menu for allowing a user to input the collective setting group name.

Further, the controller 110 may control the display 134 to show a user a list of one or more collective setting group names which are managed in the driver 120. Then, a user is allowed to select one of the displayed collective setting group names and change the setting values of the selected collective setting group name.

The controller 110 extracts the setting item and the setting value which have a different value from the default value in the plurality of setting items and controls the driver 120 to store the extracted setting item and the setting value if the collective setting group name is inputted and a storing button is clicked or entered. The collective setting interface part 122 receives the setting item and the setting value and outputs the received setting item and setting value to the collective setting manager 124. Further, the controller 110 stores the plurality of setting items, of which at least one setting value is changed, in the driver 120 as one collective setting group name.

The collective setting manager 124 stores the setting item received through the collective setting interface part 122 and the setting value inputted by the user, and registers and manages the collective setting group name inputted by the user.

If the user inputs the collective setting group name in the collective setting group name input area 532 or selects one of one or more collective setting group names shown in the list, the collective setting manager 124 outputs the setting item and setting value stored in the inputted collective setting group name to the emphasizing part 126. The emphasizing processor 126 processes the setting item and the setting value to emphatically display the stored setting item and setting value on the display 134. The processed setting item and setting value include information of the coordinates, the location, the font size and so on of the setting item and setting value displayed on the option setting screen 500. The processed setting item and setting value are displayed on the option setting screen 500 through the collective setting interface part 122.

Accordingly, a setting item displaying area 540 having the changed setting value may be highlighted as illustrated in FIG. 5B or the font size of the changed setting value and setting item of the setting item displaying area 540 may be differently displayed from the default font size as illustrated in FIG. 5C. Also, the font type or a color of the setting item and setting value of the setting item displaying area 540 may be differently displayed from a default font type or a default color to emphatically display the setting item and setting value whose setting value is changed.

Figure 3:
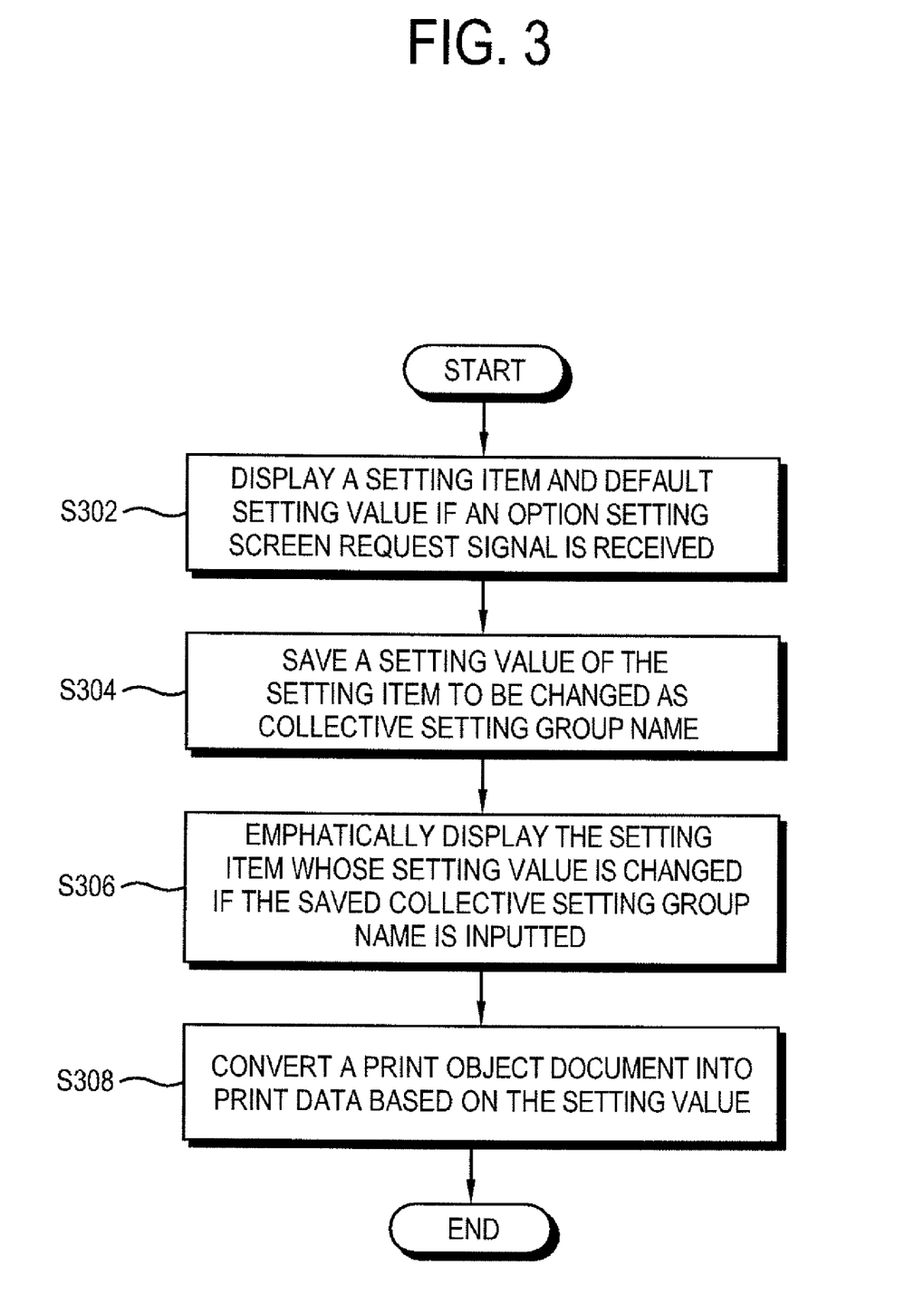
FIG. 3 is a flowchart schematically illustrating a control method of an image forming control apparatus according to an exemplary embodiment of the present general inventive concept.

As illustrated in FIG. 3, if a request signal for an option setting screen 500 is inputted, the controller 110 of the image forming control apparatus 100 displays the option setting screen 500 showing the setting item and the default setting value of the setting item stored in the driver 120 on the display 134 at operation S302.

The user changes the setting values of the setting items 510 displayed on the display 134 according to a print option. Next, if the user inputs the collective setting group name in the collective setting group name input part 532 and clicks or enters the storing button, the controller 110 stores the collective setting group name, the changed setting value and the setting item having the changed setting value in the collective setting manager 124 of the driver 120 at operation S304.

If the collective setting group name stored in the collective setting manager 124 is inputted or selected in the collective setting group name input area 532, the controller 110 changes the setting values of the setting items displayed on the display 134 into the setting values stored in the collective setting manager 124, and displays the highlighted setting item displaying area 540 of the option setting screen 500, or the large font-sized setting item 510 and the setting value changing area 520 to emphasize that the setting value and the setting item are changed at operation S306.

If the user clicks the print button of the print screen through the user input part 132, the print object document is converted into the print data based on the setting value currently set in the driver 120 and the converted print data is outputted to the predetermined image forming apparatus at operation S308.

Figure 4:
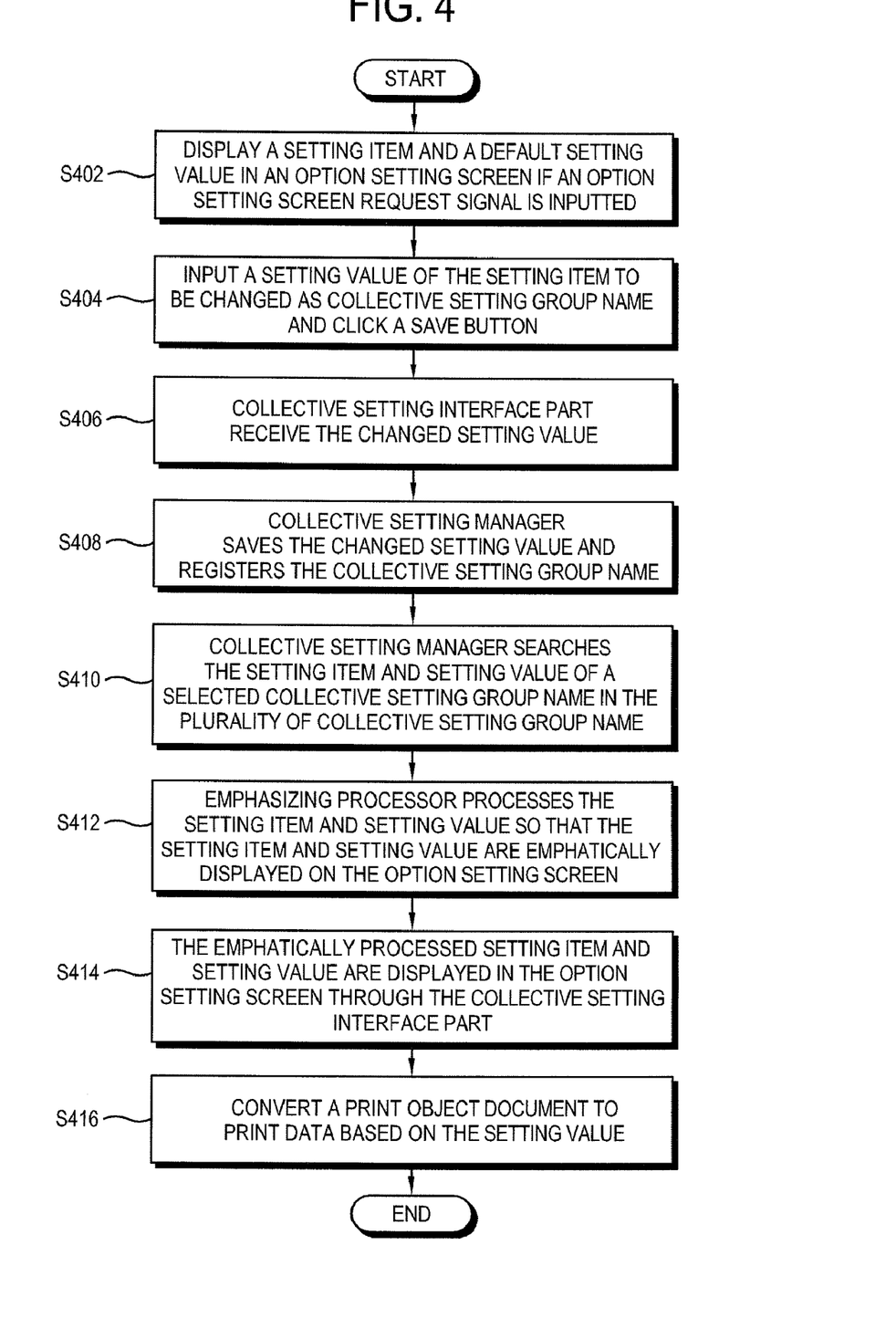
FIG. 4 is a flowchart illustrating a control method of an image forming control apparatus according to an exemplary embodiment of the present general inventive concept.

As illustrated in FIG. 4, the controller 110 of the image forming control apparatus 100 displays the option setting screen 500 having the setting item and the default setting value of the setting item stored in the driver 120 if an option setting screen request signal is inputted through the user input part 132 at operation S402.

The user changes the setting values of the setting items 510 displayed on the display 134 through the user input part 132 according to the print option which the user wants. Next, the user inputs the collective setting group name in the collective setting group name input part 532 and clicks the storing button at operation S404.

The controller 110 extracts the setting item and setting value having a different value from the default value in the plurality of setting items and controls the driver 120 to store the extracted setting value and setting item if the collective setting group name is inputted and the store button is clicked. The collective setting interface part 122 receives the setting item and the setting value and outputs the received setting value and setting item to the collective setting manager 124 at operation S406.

The collective setting manager 124 stores the setting item and the setting value and registers the collective setting group name inputted by the user at operation S408.

If the user selects one of the collective setting group names registered in the collective setting manager 122 in the setting group input area 532 of the option setting screen 500 through the user input part 132, the controller 110 transmits the selected collective setting group name to the collective setting interface part 122. Therefore, the collective setting manager 124 searches the setting item and the setting value stored in the collective setting group name selected among the stored collective setting group names and outputs the searched setting item and setting value to the emphasizing processor 126 at operation S410.

The emphasizing processor 126 processes the setting item and the setting value to emphatically display the setting item and the setting value in the option setting screen 500 at operation S412. The processed setting item and setting value include the information of the location, the shape, the size of the font and so on.

The processed setting item and setting value to be displayed on the option setting screen 500 is outputted through the collective setting interface part 122. Therefore, the controller 110 changes the setting values of the setting items displayed on the option setting screen 500 into the setting values stored in the collective setting manager 124, and displays the highlighted setting item displaying area 540 of the option setting screen 500, or the large font-sized setting item 510 and the setting value changing area 520 to emphasize that the setting value and the setting item are changed at operation S414.

A computer-readable medium containing computer-readable codes as a program to execute a method of an image forming control apparatus, the method comprising a screen image to display a plurality of setting items and to emphatically display a setting item having a change setting value. That is, the present general inventive concept can be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

If the user clicks the print button of the print screen through the user input part 132, the print object document is converted to the print data based on the setting value currently set in the driver 120 and is outputted to the predetermined image forming apparatus at operation S416.

As described above, if the setting value of the plurality of setting items about image forming is collectively changed, the user is easily capable of checking the changed setting item.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A control method of a stand-alone multi-function peripheral, the control method comprising:
   (a) displaying a plurality of setting items about an image forming process option of a plurality of image forming process options, each of the setting items associated with a setting value which can be changed from a default setting value to a non-default setting value;
   (b) receiving an item user input to change one of the plurality of setting items from a default setting value to the non-default setting value in connection with the image forming process;
   (c) changing the one of the plurality of setting items to the non-default setting value according to the received item user input;
   (d) receiving a group-name user input to associate the changed one of the setting items with a collective setting group name of the image forming process option;
   (e) repeating (a) through (d) at least one time so that there are at least two collective setting group names of the image forming process option,
   storing data in connection with each of the two collective setting group names;
   receiving a group-select user input to select one of the two collective setting group names;
   when one of the two collective setting group names is selected, emphatically displaying the changed one of the plurality of setting items of the selected collective setting group name, which is changed to the non-default setting value, and non-emphatically displaying at least one of the remaining setting items, of which the setting value is unchanged from a default setting value, wherein the emphatically displayed setting item and the non-emphatically displayed setting item are simultaneously displayed on a same user interface screen; and converting a print object document into print data corresponding to the selected collective setting group name of the image forming process option based on the setting values of the plurality of setting items including the changed one.

2. The control method according to claim 1, wherein the emphatically displaying of the setting item comprises highlighting the setting item changed to the non-default setting value.

3. The control method according to claim 1, wherein the emphatically displaying of the setting item comprises using a different font type or size for displaying the setting item changed to the non-default setting value.

4. The control method according to claim 1, wherein the emphatically displaying of the setting item comprises displaying the setting item changed to the non-default setting value using a color different from a default color.

5. The control method according to claim 1, wherein the storing data comprises storing the plurality of setting items, of which the setting value is changed, as a collective setting group name.

6. The control method according to claim 5, further comprising:
generating and displaying at least one menu for allowing a user to input the collective setting group name.

7. The control method according to claim 5, further comprising:
displaying a list of the stored one or more collective setting group names.

8. The control method according to claim 7, further comprising:
when one of the displayed collective setting group names is selected, emphatically displaying the setting item changed in the setting value among the setting items stored in the selected collective setting group name.

9. The control method according to claim 1, further comprising printing the print data by the stand-alone multi-function peripheral.

10. The control method according to claim 1, wherein a first setting item among the plurality of setting items is associated with selection of a paper orientation.

11. The control method according to claim 10, wherein a second setting item among the plurality of setting items is associated with selection of a number of pages to be printed on a side of a paper.

12. The control method according to claim 11, wherein a third setting item among the plurality of setting items is associated with selection of a double-sided printing.

13. An apparatus comprising a stand-alone multi-function peripheral comprising:
a display to display a user interface screen; and
a controller that controls the user interface screen (a) to display a plurality of setting items about an image forming process option of a plurality of image forming process options, each of the setting items associated with a setting value which can be changed from a default setting value to a non-default setting value, (b) to receive an item user input to change one of the plurality of setting items from the default setting value to the non-default setting value in connection with the image forming process, (c) to change the one of the plurality of setting items to the non-default setting value according to the received item user input, (d) to receive a group-name user input to associate the changed one of the setting items with a collective setting group name of the image forming process option, (e) to repeat (a) through (d) at least one time so that there are at least two collective setting group names for the image forming process option, to store data in connection with each of the two collective setting group names, and to receive a group-select user input to select one of the two collective setting group names, wherein, when one of the two collective setting group names is selected, the controller controls the user interface screen to emphatically display the changed one of the plurality of setting items of the selected collective setting group name, whose setting value is changed to the non-default setting value, and to non-emphatically display at least one of the remaining setting items, whose setting value is unchanged from a default setting value, wherein the emphatically displayed setting item and the non-emphatically displayed setting item are simultaneously displayed on the same user interface screen, and wherein the controller converts a print object document into print data corresponding to the selected collective setting group name of the image forming process option based on the setting values of the plurality of setting items including the changed one.

14. The apparatus according to claim 13, wherein the controller emphatically displays the setting item by highlighting the setting item changed to the non-default setting value.

15. The apparatus according to claim 13, wherein the controller emphatically displays the setting item changed to the non-default setting value by using a font type or size that is different from a default font type or size.

16. The apparatus according to claim 13, wherein the controller emphatically displays the setting item changed to the non-default setting value by using a color different from a default color.

17. The apparatus according to claim 13, wherein the controller processes the plurality of setting items, of which the setting value is changed, to be stored as a collective setting group name.

18. The apparatus according to claim 17, wherein the controller controls the display to generate and display at least one menu for allowing a user to input the collective setting group name.

19. The apparatus according to claim 17, wherein the controller controls the display to display a list of the one or more collective setting group names managed in the driver.

20. The apparatus according to claim 19, wherein, when one of the displayed collective setting group names is selected, the controller controls the display to emphatically display the setting item changed in the setting value among the setting items stored in the selected collective setting group name.

21. The apparatus according to claim 13, wherein the stand-alone multi-function peripheral prints the print data.

22. The apparatus according to claim 13, further comprising:
a user input part,
wherein the controller changes the setting value on the basis of a setting command input through the user input part.

23. The apparatus according to claim 13, further comprising:
an interface part,
wherein the controller outputs the print data to a predetermined image forming apparatus through the interface part.

24. The apparatus according to claim 13, wherein a first setting item among the plurality of setting items is associated with selection of a paper orientation.

25. The apparatus according to claim 24, wherein a second setting item among the plurality of setting items is associated with selection of a number of pages to be printed on a side of a paper.

26. The apparatus according to claim 25, wherein a third setting item among the plurality of setting items is associated with selection of a double-sided printing.

27. The apparatus according to claim 13, wherein the setting items are associated with an image forming process.

* * * * *

UNITED STATES PATENT AND TRADEMARK OFFICE
CERTIFICATE OF CORRECTION

PATENT NO. : 8,305,592 B2
APPLICATION NO. : 11/953260
DATED : November 6, 2012
INVENTOR(S) : Chang-soo Park Page 1 of 2

It is certified that error appears in the above-identified patent and that said Letters Patent is hereby corrected as shown below:

In the claims section, claim 1 should be changed to insert --option-- at the end of (b) as follows:

1. A control method of a stand-alone multi-function peripheral, the control method comprising:
(a) displaying a plurality of setting items about an image forming process option of a plurality of image forming process options, each of the setting items associated with a setting value which can be changed from a default setting value to a non-default setting value;
(b) receiving an item user input to change one of the plurality of setting items from a default setting value to the non-default setting value in connection with the image forming process option;
(c) changing the one of the plurality of setting items to the non-default setting value according to the received item user input;
(d) receiving a group-name user input to associate the changed one of the setting items with a collective setting group name of the image forming process option;
(e) repeating (a) through (d) at least one time so that there are at least two collective setting group names of the image forming process option,
storing data in connection with each of the two collective setting group names;
receiving a group-select user input to select one of the two collective setting group names;
when one of the two collective setting group names is selected, emphatically displaying the changed one of the plurality of setting items of the selected collective setting group name, which is changed to the non-default setting value, and non-emphatically displaying at least one of the remaining setting items, of which the setting value is unchanged from a default setting value, wherein the emphatically displayed setting item and the non-emphatically displayed setting item are simultaneously displayed on a same user interface screen; and
converting a print object document into print data corresponding to the selected collective setting group name of the image forming process option based on the setting values of the plurality of setting items including the changed one.

Signed and Sealed this
Twenty-fifth Day of June, 2013

Teresa Stanek Rea
*Acting Director of the United States Patent and Trademark Office*

CERTIFICATE OF CORRECTION (continued)
U.S. Pat. No. 8,305,592 B2

In the claims section, claim 13 should be changed to insert --option-- at the end of (b) as follows:

13. An apparatus comprising a stand-alone multi-function peripheral comprising:
a display to display a user interface screen; and
a controller that controls the user interface screen (a) to display a plurality of setting items about an image forming process option of a plurality of image forming process options, each of the setting items associated with a setting value which can be changed from a default setting value to a non-default setting value, (b) to receive an item user input to change one of the plurality of setting items from the default setting value to the non-default setting value in connection with the image forming process option, (c) to change the one of the plurality of setting items to the non-default setting value according to the received item user input, (d) to receive a group-name user input to associate the changed one of the setting items with a collective setting group name of the image forming process option, (e) to repeat (a) through (d) at least one time so that there are at least two collective setting group names for the image forming process option, to store data in connection with each of the two collective setting group names, and to receive a group-select user input to select one of the two collective setting group names,
wherein, when one of the two collective setting group names is selected, the controller controls the user interface screen to emphatically display the changed one of the plurality of setting items of the selected collective setting group name, whose setting value is changed to the non-default setting value, and to non-emphatically display at least one of the remaining setting items, whose setting value is unchanged from a default setting value,
wherein the emphatically displayed setting item and the non-emphatically displayed setting item are simultaneously displayed on the same user interface screen, and
wherein the controller converts a print object document into print data corresponding to the selected collective setting group name of the image forming process option based on the setting values of the plurality of setting items including the changed one.

UNITED STATES PATENT AND TRADEMARK OFFICE
CERTIFICATE OF CORRECTION

| | | |
|---|---|---|
| PATENT NO. | : 8,305,592 B2 | |
| APPLICATION NO. | : 11/953260 | |
| DATED | : November 6, 2012 | |
| INVENTOR(S) | : Chang-soo Park | |

It is certified that error appears in the above-identified patent and that said Letters Patent is hereby corrected as shown below:

In the claims section, claim 1 should be changed to insert --option-- at the end of (b),
Column 8, line 38 - Column 9, line 9, claim 1 should read as follows:

1. A control method of a stand-alone multi-function peripheral, the control method comprising:
(a) displaying a plurality of setting items about an image forming process option of a plurality of image forming process options, each of the setting items associated with a setting value which can be changed from a default setting value to a non-default setting value;
(b) receiving an item user input to change one of the plurality of setting items from a default setting value to the non-default setting value in connection with the image forming process option;
(c) changing the one of the plurality of setting items to the non-default setting value according to the received item user input;
(d) receiving a group-name user input to associate the changed one of the setting items with a collective setting group name of the image forming process option;
(e) repeating (a) through (d) at least one time so that there are at least two collective setting group names of the image forming process option,
storing data in connection with each of the two collective setting group names;
receiving a group-select user input to select one of the two collective setting group names;
when one of the two collective setting group names is selected, emphatically displaying the changed one of the plurality of setting items of the selected collective setting group name, which is changed to the non-default setting value, and non-emphatically displaying at least one of the remaining setting items, of which the setting value is unchanged from a default setting value, wherein the emphatically displayed setting item and the non-emphatically displayed setting item are simultaneously displayed on a same user interface screen; and
converting a print object document into print data corresponding to the selected collective setting group name of the image forming process option based on the setting values of the plurality of setting items including the changed one.

This certificate supersedes the Certificate of Correction issued June 25, 2013.

Signed and Sealed this
Twenty-third Day of July, 2013

Teresa Stanek Rea
*Acting Director of the United States Patent and Trademark Office*

CERTIFICATE OF CORRECTION (continued)
U.S. Pat. No. 8,305,592 B2

In the claims section, claim 13 should be changed to insert --option-- at the end of (b), Column 9, line 53 - Column 10, line 25, claim 13 should read as follows:

13. An apparatus comprising a stand-alone multi-function peripheral comprising:
a display to display a user interface screen; and
a controller that controls the user interface screen (a) to display a plurality of setting items about an image forming process option of a plurality of image forming process options, each of the setting items associated with a setting value which can be changed from a default setting value to a non-default setting value, (b) to receive an item user input to change one of the plurality of setting items from the default setting value to the non-default setting value in connection with the image forming process option, (c) to change the one of the plurality of setting items to the non-default setting value according to the received item user input, (d) to receive a group-name user input to associate the changed one of the setting items with a collective setting group name of the image forming process option, (e) to repeat (a) through (d) at least one time so that there are at least two collective setting group names for the image forming process option, to store data in connection with each of the two collective setting group names, and to receive a group-select user input to select one of the two collective setting group names,
wherein, when one of the two collective setting group names is selected, the controller controls the user interface screen to emphatically display the changed one of the plurality of setting items of the selected collective setting group name, whose setting value is changed to the non-default setting value, and to non-emphatically display at least one of the remaining setting items, whose setting value is unchanged from a default setting value,
wherein the emphatically displayed setting item and the non-emphatically displayed setting item are simultaneously displayed on the same user interface screen, and
wherein the controller converts a print object document into print data corresponding to the selected collective setting group name of the image forming process option based on the setting values of the plurality of setting items including the changed one.